(12) United States Patent
Björklund et al.

(10) Patent No.: US 12,246,770 B2
(45) Date of Patent: Mar. 11, 2025

(54) PASSENGER PROTECTION UNIT FOR VEHICLE AND METHOD FOR CONTROLLING A PASSENGER PROTECTION UNIT

(71) Applicant: Volvo Car Corporation, Gothenburg (SE)

(72) Inventors: Magnus Björklund, Gothenburg (SE); Anders Carlsson, Gothenburg (SE); David Beskow, Gothenburg (SE); Gustav Bonde, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 18/457,587

(22) Filed: Aug. 29, 2023

(65) Prior Publication Data

US 2024/0083491 A1 Mar. 14, 2024

(30) Foreign Application Priority Data

Sep. 13, 2022 (EP) .................................... 22195449

(51) Int. Cl.
*B62D 1/19* (2006.01)
*B60R 21/205* (2011.01)
(Continued)

(52) U.S. Cl.
CPC ............ *B62D 1/197* (2013.01); *B60R 21/205* (2013.01); *B62D 1/183* (2013.01);
(Continued)

(58) Field of Classification Search
CPC ...... B62D 1/197; B62D 1/183; B60R 21/205; B60R 2021/01013; B60R 2021/01034; B60R 2021/01252
See application file for complete search history.

(56) References Cited

U.S. PATENT DOCUMENTS

| 6,149,196 A * | 11/2000 | Guiard ................... B60K 37/00 296/74 |
| 2014/0028008 A1* | 1/2014 | Stadler ................... B62D 1/192 280/777 |

(Continued)

FOREIGN PATENT DOCUMENTS

| WO | WO-9616841 A1 * | 6/1996 | ........... B60R 21/203 |
| WO | 2021151750 A1 | 8/2021 | |

OTHER PUBLICATIONS

WO9616841A1 Machine English translation (Year: 1995).*

(Continued)

*Primary Examiner* — Jason D Shanske
*Assistant Examiner* — Matthew James O'Neill
(74) *Attorney, Agent, or Firm* — Amin, Turocy & Watson, LLP

(57) ABSTRACT

A passenger protection unit for a vehicle can comprise an adjustable steering apparatus configured to be lockable at least in a first position and a second position, an instrument panel, an airbag module comprising at least an airbag, a crash control unit, and a retracting mechanism configured to initiate a movement of the steering apparatus in a retracting direction, wherein the crash control unit is configured to release movement of the steering apparatus at least in the retracting direction upon detecting a crash risk or an upcoming crash, wherein the crash control unit is further configured to activate the retracting mechanism, and wherein the crash control unit is further configured to deploy the airbag upon an upcoming crash.

18 Claims, 4 Drawing Sheets

(51) Int. Cl.
  *B62D 1/183* (2006.01)
  *B60R 21/01* (2006.01)
(52) U.S. Cl.
  CPC .............. *B60R 2021/01013* (2013.01); *B60R 2021/01034* (2013.01); *B60R 2021/01252* (2013.01)

(56) References Cited

U.S. PATENT DOCUMENTS

| | | | | |
|---|---|---|---|---|
| 2019/0143846 A1* | 5/2019 | Rolka | .................. | B60N 2/0276 280/735 |
| 2019/0381962 A1* | 12/2019 | Sheldon | .................. | B62D 1/183 |
| 2020/0001815 A1* | 1/2020 | Minakawa | ............ | B60R 21/205 |

OTHER PUBLICATIONS

WO-9616841-A1 Machine English Translation (Year: 1996).*
Extended European Search Report received for European Application Serial No. 22195449.8 dated Mar. 1, 2023, 6 pages.
Communication pursuant to Article 94(3) EPC received for EP Patent Application Serial No. EP22195449.8 dated Sep. 18, 2024, 5 pages.

* cited by examiner

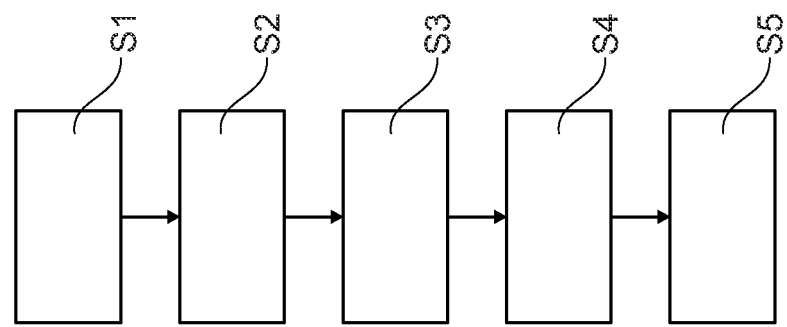
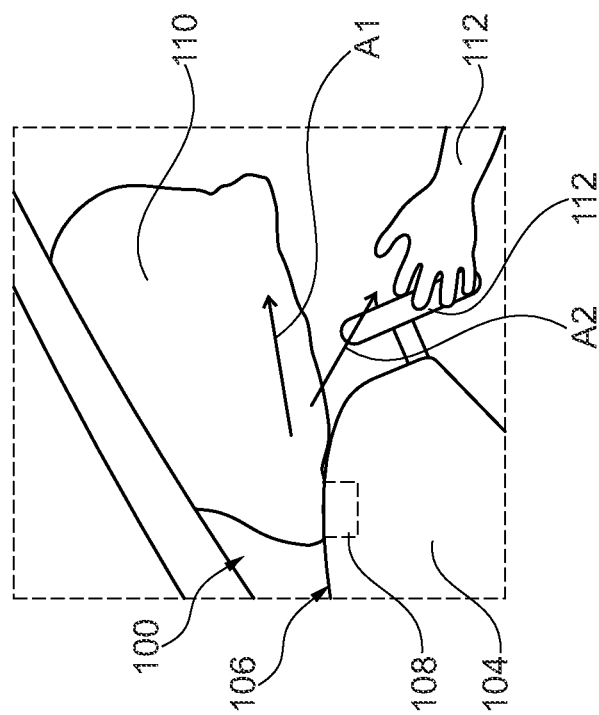

PASSENGER PROTECTION UNIT FOR VEHICLE AND METHOD FOR CONTROLLING A PASSENGER PROTECTION UNIT

CROSS-REFERENCE TO RELATED APPLICATIONS

This application claims the benefit of and priority to pending EP patent application serial number 22195449.8, filed Sep. 13, 2022, and entitled "PASSENGER PROTECTION UNIT FOR VEHICLE AND METHOD FOR CONTROLLING A PASSENGER PROTECTION UNIT," the entirety of which is hereby incorporated by reference herein.

TECHNICAL FIELD

The present disclosure relates to a passenger protection unit for a vehicle, a vehicle, and a method for controlling a passenger protection unit.

BACKGROUND

Protection units for vehicles can comprise at least a front airbag for a driver of the vehicle, which is configured to mitigate the consequences of a crash, particularly to reduce a risk for (severe) injuries to the driver in case of a crash. A size of the airbag in a deployed state can be tailored to an average distance between a steering wheel of the vehicle and the driver. Further, steering wheels can be moved towards a dashboard of the vehicle in case the front airbag is deploying, to decelerate the driver, particularly to stop the driver's forward movement, in order to reduce forces acting on the driver in case of a crash.

In vehicles having an autonomous driving mode, a steering wheel can be retracted and to stored in the dashboard. In such a retracted position of the steering wheel, the effect of decelerating the driver and/or reducing the forces acting on the driver by retracting the steering wheel is missing, thereby increasing the risk for (severe) injuries to the driver.

SUMMARY

Therefore, there exists a need to provide an improved passenger protection unit for a vehicle, particularly a passenger protection device allowing to reduce the risk for (severe) injuries to the driver independent from a position of a steering wheel, as well as a method for controlling a passenger protection unit.

The object of the present disclosure is at least partially solved or alleviated solved by the subject-matter of the appended independent claims, wherein further examples are incorporated in the dependent claims.

According to a first aspect, there is provided a passenger protection unit for a vehicle. The passenger protection unit comprises an adjustable steering apparatus configured to be lockable at least in a first position and a second position, an instrument panel, an airbag module comprising at least an airbag, a crash control unit, and a retracting mechanism configured to initiate a movement of the steering apparatus in a retracting direction. The crash control unit is configured to release movement of the steering apparatus at least in the retracting direction upon detecting a crash risk or an upcoming crash. Further, the crash control unit is configured to activate the retracting mechanism and to deploy the airbag upon an upcoming crash being detected.

The steering apparatus may be continuously adjustable, and/or lockable in every position between the first position and the second position.

The steering apparatus comprises a steering column and a steering element, e.g., a steering wheel. Further, the steering column may comprise a telescopic steering shaft. Additionally, the steering apparatus may be a steer-by-wire steering apparatus.

The first position of the adjustable steering apparatus corresponds to a retracted position, e.g., a position, in which the steering apparatus does not protrude from the instrument panel towards a passenger/driver. Usually, the steering apparatus is in first position, when the vehicle is in an autonomous driving mode, in which the driving of the vehicle is controlled by a control unit of the vehicle, and mostly no driving action of the driver is needed. The second position corresponds to a non-retracted position, e.g., a position, in which the steering apparatus at least partly protrude from the instrument panel towards the driver. Such position usually corresponds to a position of the steering apparatus for a normal, thus non-autonomous, driving mode, in which the driver controls the vehicle.

Consequently, a distance between the steering apparatus, particularly a steering element of the steering apparatus, and the driver may vary dependent on the position of the steering apparatus and/or the driving mode of the vehicle. In detail, the distance between the driver and the steering apparatus in the first position is larger than the distance between the driver and the steering apparatus in the second position. Hereinafter, the distance between the driver and the steering apparatus in the first position is referred to as "first distance", and the distance between the driver and the steering apparatus in the second position is referred to as "second distance".

The airbag of the passenger protection unit according to the first aspect is designed to be larger than currently used airbags, which are designed to protect the driver from (severe) injuries in case the steering apparatus is not fully storable in the instrument panel. In particular, the airbag of the airbag module is designed to have a size configured to protect the driver from (severe) injuries in case, the steering apparatus is in the first position, particularly in a fully retracted position, when a crash happens. In other words, the size of the airbag is designed to provide sufficient protection, e.g., by sufficiently decelerating a forward movement of the driver and/or reducing forces acting on the driver, in case, the steering apparatus is already in a fully retracted position, when the crash happens.

In case that, when the crash happens, the steering apparatus is not in the first position, particularly, in case, the steering apparatus is in the second position, e.g., a non-retracted position, the steering apparatus is moved to the first position, particularly to the fully retracted position, before and/or while the airbag deploys, thereby increasing the distance between the driver and the steering apparatus. Such movement of the steering apparatus is initiated and/or performed by the retracting mechanism, which is controlled by the crash control unit.

In other words, by moving the steering apparatus into the first position, the second distance between the driver and the steering apparatus is changed to substantially correspond to the first distance. Thereby, the risk of an excessive, and potentially harmful, impact of the airbag on the driver, particularly due to insufficient distance between the steering apparatus and the driver, can be at least significantly reduced or even prevented.

Further, the movement of the steering apparatus in the retracting direction may increase or support the decelerating effect on the driver, thereby further reducing the risk of (severe) injuries to the driver. Consequently, the passenger protection unit allows protecting the driver from (severe) injuries in case of crash regardless of the distance between the steering apparatus and the driver.

The crash control unit is configured to control the retracting mechanism and the deployment of the airbag. The crash control unit is further configured to detect or determine a crash risk or an upcoming crash based on received signals from vehicle sensors. The detection of a crash risk corresponds to information of an upcoming crash, which may still be avoidable, whereas the detection of an upcoming crash corresponds to information of an unavoidable crash. The detection of the crash risk allows a pre-positioning of the steering apparatus before the crash happens. In other words, upon detecting the crash risk, the movement of the steering apparatus in the retracting direction may be initiated before deploying the airbag, thereby at least starting to increase the distance between the steering apparatus and the driver before the crash.

According to an example, the retracting mechanism may comprise a pyrotechnic means configured to generate a retracting force for moving the steering apparatus into the first position.

By activating the retracting mechanism, the pyrotechnic means may perform an exothermic reaction, generating a retracting force, which is applied to the steering apparatus such that the steering apparatus is moved in the retracting direction and into the first position. The pyrotechnic means may allow generating a retracting force quickly, resulting in short response time.

According to an example, the retracting mechanism may comprise a magnetic means configured to apply a magnetic force for moving the steering apparatus into the first position.

The magnetic means may be a permanent magnet allowing selectively applying a magnetic force. Activating the magnetic means may allow applying the magnetic force instantly, resulting in short response time.

According to an example, the retracting mechanism may be configured to move the steering apparatus into the first position by using inertia forces acting during the crash.

Since a crash of the vehicle causes a prompt and/or severe deceleration of the vehicle, inertia forces acting during the crash may be of a significant value, wherein the inertia forces acting on the steering apparatus may result in a retracting movement of the steering apparatus. Thus, the retracting mechanism using the inertia forces may correspond to a passive retracting mechanism since the inertia forces are not actively and/or additionally generated, but an effect of the crash, which is used to move the steering apparatus. In particular, the retracting mechanism using the effect of the inertia forces acting on the steering apparatus during the crash may further comprise means for actively generating retracting forces, e.g., pyrotechnic means, magnetic means etc., to reduce response time.

In other words, since the inertia forces do not act on the steering apparatus until the crash happens, the retracting mechanism may be a combination of means configured to actively apply a retracting force on the steering apparatus and the inertia forces, because the actively generated retracting forces, e.g., by the pyrotechnic means, magnetic means, etc., may allow being activated and/or applied upon detecting a crash risk and/or an upcoming crash, thus at least shortly before the crash actually happens, thereby improving response time.

According to an example, the retracting mechanism may be configured to move the steering apparatus into the first position by using reaction forces generated by deploying the airbag.

In case, the airbag may be stored or positioned on the steering apparatus, particularly on the steering element, the deployment of the airbag may generate reaction forces acting on the steering apparatus in the retracting direction, therefore causing a movement of the steering apparatus in the retracting direction.

According to an example, the retracting mechanism may comprise a spring element generating a force configured to support retracting the steering apparatus into the first position.

Thus, the spring element may be configured to accelerate the retracting movement, thereby improving response time and/or reducing time needed to move the steering apparatus into the first position. Additionally, or alternatively, the spring element may be used to initiate the retracting movement of the steering apparatus.

According to an example, the retracting mechanism may comprise a damping element configured to damp the movement of the steering apparatus, particularly close to the first position.

Thus, the damping element mitigates the impact on the steering apparatus reaching the first position. Further, the damping element may reduce or prevent a rebound of the steering apparatus reaching the first position.

According to an example, the passenger protection unit may further comprise a turning mechanism configured to move or turn a steering element of the steering apparatus into a predetermined storing position.

The instrument panel may comprise a storing compartment which is configured to accommodate the retracted steering element. The storing compartment may have a predetermined form and/or size, which allow accommodating the steering element in at least the predetermined storing position. In other words, storing the steering element in a predetermined storing position may allow reducing a required space for the storing compartment.

In particular, steering elements having a width dimension being different from a length dimension, such as steering elements having a rectangular design, may require different form and/or sizes of the storing compartment dependent on the position of such steering element, resulting in a storing compartment being larger than the steering element to accommodate the steering element in every possible position.

Thus, to reduce installation space required for storing/accommodating the steering element in the instrument panel, the turning mechanism may move the steering element into a predetermined storing position before and/or while the retracting movement of the steering apparatus, wherein the predetermined storing position of the steering element substantially corresponds to the form and/or size of the storing compartment. In other words, the form and/or size of the storing compartment may be designed to accommodate the steering element in the predetermined storing position.

According to an example, the turning mechanism may be integrated into the retracting mechanism.

Integrating the turning mechanism into the retracting mechanism may require a reduced installation space compared to a turning mechanism being separate from the retracting mechanism. Further, forces and/or effects for retracting the steering apparatus may be simultaneously used for turning the steering element into the predetermine storing position.

According to an example, the airbag module may be positioned in a steering element, e.g., a steering wheel, of the steering apparatus.

Positioning the airbag module in the steering element may provide a position directed toward the occupant and/closer to the occupant, thereby allowing the use of a smaller airbag than when positioned in the instrument panel.

According to an example, the steering element may have a rectangular design.

The rectangular design of the steering element, particularly of a steering wheel, may provide a larger support basis for the airbag towards both, the steering element and a windshield of the vehicle, when being in the stored position. Further, a steering element having a rectangular design may be easier to store in the instrument panel, that is, may need a smaller storing compartment than a circular steering wheel.

According to an example, the airbag module may be positioned in the instrument panel.

The instrument panel may allow installing a larger airbag than the steering element. Further, positioning the airbag module in the instrument panel may allow the steering element to be more freely designed. Additionally, deploying the airbag from a fixed position as provided by the instrument panel, may allow predicting a deployed airbag position more easily and/or reliably. In case, the airbag module is positioned in the instrument panel, it should be noted that the retracting direction may be a movement of the steering apparatus along its longitudinal axis, or the retracting direction may be a combination of moving, particularly retracting, the steering apparatus along its longitudinal axis and a pivoting movement of the longitudinal axis of the steering apparatus towards the bottom of the vehicle, that means a downward movement of the steering apparatus. Such downward movement may provide additional space for the deploying airbag being positioned in the instrument panel.

According to an example, a deployment movement/direction of the airbag module may be controllable.

Controlling the deployment movement of the airbag may allow improving a positioning accuracy of the deployed airbag. Further, the position of the deployed airbag may be chosen such that a full retraction of the steering element might not be required to achieve the best possible protection of the driver, allowing further improving response time of the passenger protection unit. Additionally, the first position of the steering apparatus not being a fully retracted position, may further allow reducing the risk of hand and/or finger injuries, specifically bruises, caused by pinching fingers and/or parts of the handy between the fully retracted steering apparatus and the instrument panel.

According to an example, the airbag module may further comprise an activation device configured to initiate deploying the airbag. The movement may be controlled through controlling gas flow for deploying the airbag and/or design of the airbag. For example, the airbag may include straps configured to position the airbag. Additionally, or alternatively, a position of the airbag relative to a windshield and/or a design of a lid of the airbag module may influence the movement of the deploying airbag.

The activation device may comprise pyrotechnic means allowing to quickly deploy the airbag.

According to an example, the deployed airbag may be configured to be positioned between the retracted steering apparatus and the passenger.

This allows using an airbag having only one size in case of a crash while the vehicle is driving an autonomous driving mode as well as while the vehicle is driving in a normal, manual, driving mode.

According to a second aspect, there is provided a vehicle. The vehicle comprises a passenger compartment, an advanced driver assistance system, and a passenger protection unit according to the first aspect. The advanced driver assistance system is configured to transmit information, e.g., signals, to the crash control unit of the passenger protection unit regarding a crash risk and/or an upcoming crash.

The advanced driver assistance system may allow improving the prediction of an upcoming crash and/or increasing the accuracy of a determined crash risk.

According to a third aspect, there is provided a method for controlling a passenger protection unit according to the first aspect. The method comprises the following steps, but not necessarily in this order:

receiving, by the crash control unit, information regarding a detected crash risk and/or a detected upcoming crash,
releasing the movement of the steering apparatus in at least a retracting direction,
activating, by the crash control unit, the retracting mechanism,
retracting the steering apparatus into the first position, and
in case of an upcoming crash, deploying the airbag.

This allows using only one airbag of one predetermined size, the size of the airbag being designed to provide sufficient protection, e.g., by sufficiently decelerating a forward movement of the driver and/or reducing forces acting on the driver, in case, the steering apparatus is already in a fully retracted position, when the crash happens.

In case that, when the crash happens, the steering apparatus is not in the first position, particularly, in case, the steering apparatus is in the second position, e.g., a non-retracted position, by releasing the movement of the steering apparatus in at least the retracting direction, and activating the retracting mechanism, the steering apparatus is moved to the first position, particularly to the fully retracted position, before and/or while the airbag deploys, thereby increasing the distance between the driver and the steering apparatus.

In other words, by moving the steering apparatus into the first position, the second distance between the driver and the steering apparatus is changed to substantially correspond to the first distance. Thereby, the risk of an excessive, and potentially harmful, impact of the airbag on the driver, particularly due to insufficient distance between the steering apparatus and the driver, can be at least significantly reduced or even prevented.

Further, the movement of the steering apparatus in the retracting direction may increase or support the decelerating effect on the driver, thereby further reducing the risk of (severe) injuries to the driver. Consequently, the passenger protection unit allows protecting the driver from (severe) injuries in case of crash regardless of the distance between the steering apparatus and the driver.

Furthermore, this method does not necessarily require a determination of the position of the steering apparatus. In case, the steering apparatus may be already in the first position, the steps of releasing the of the steering apparatus in at least a retracting direction, activating, by the crash control unit, the retracting mechanism, and retracting the steering apparatus into the first position may be performed but will not cause any further position changes of the steering apparatus.

The method may be at least partly computer-implemented, and may be implemented in software or in hardware, or in software and hardware. Further, the method may be carried out by computer program instructions running on means that provide data processing functions. The data processing means may be a suitable computing means, such as an electronic control module etc., which may also be a distributed computer system. The data processing means or the computer, respectively, may comprise one or more of a processor, a memory, a data interface, or the like.

It should be noted that the above examples may be combined with each other irrespective of the aspect involved. Accordingly, the method may be combined with structural features and, likewise, the unit and the vehicle may be combined with features described above with regard to the method.

These and other aspects of the present disclosure will become apparent from and elucidated with reference to the examples described hereinafter.

BRIEF DESCRIPTION OF DRAWINGS

Examples according to the present disclosure will be described in the following with reference to the following drawings.

FIG. 4 shows a schematic view of an exemplary activated passenger protection unit.

FIG. 6 shows a schematic flow diagram of an exemplary method for controlling a passenger protection unit.

DETAILED DESCRIPTION

The figures are merely schematic representations and serve only to illustrate examples of the disclosure. Identical or equivalent elements are in principle provided with the same reference signs.

Figure 2A:
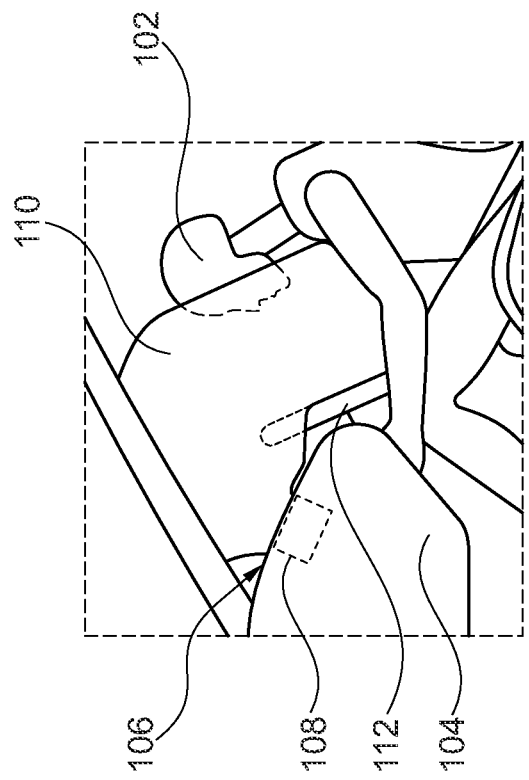
FIG. 2A shows a first exemplary position for an airbag module of an exemplary passenger protection unit.
Figure 2B:
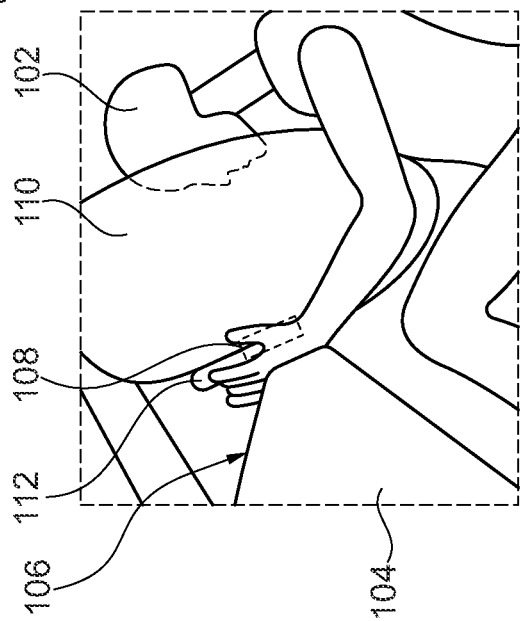
FIG. 2B shows a second exemplary position for an airbag module of an exemplary passenger protection unit.
Figure 1:
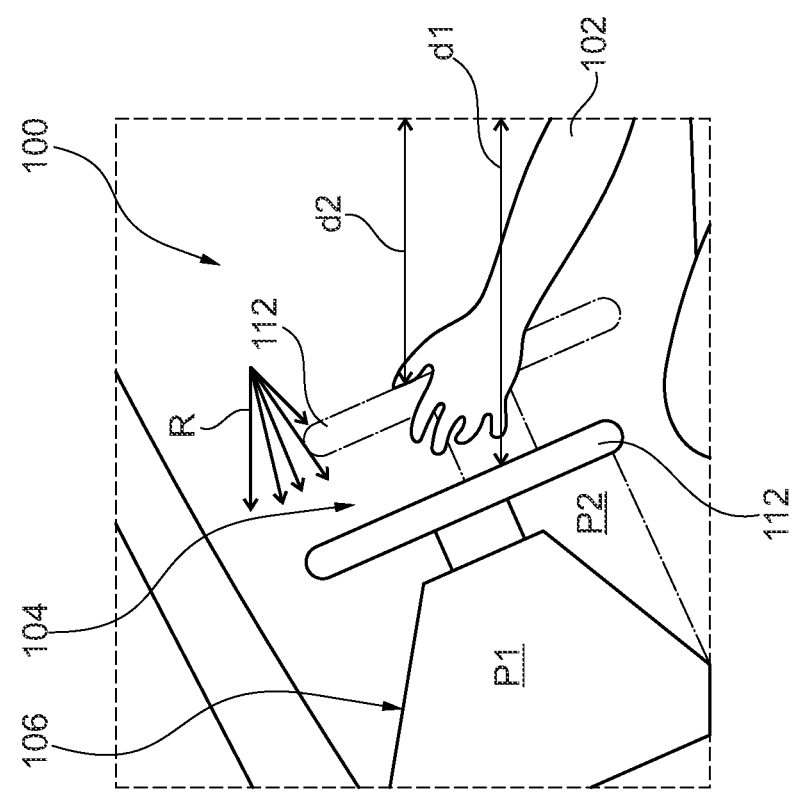
FIG. 1 shows a schematic view of an exemplary passenger protection unit for a vehicle.

FIG. 1 shows a schematic view of an example of a passenger protection unit 100 for a vehicle (not shown). The passenger protection unit 100 is configured to protect a passenger, here a driver 102, in case of a crash of the vehicle. The passenger protection unit 100 comprises an adjustable steering apparatus 104, an instrument panel 106, an airbag module 108 (see FIGS. 2A and 2B) comprising at least an airbag 110, a crash control unit (not illustrated), and a retracting mechanism (not illustrated).

The adjustable steering apparatus 104 comprises a steering element, which is exemplarily formed as a steering wheel. The steering apparatus 104 is configured to be lockable at least in a first position P1 and in a second position P2. The first position P1 may correspond to a retracted position, in which the steering apparatus 104 is at least mostly, particularly fully, retracted and stored in the instrument panel 106. The first position P1 is suitable for driving the vehicle in an autonomous driving mode. Since the driver 102 usually does not need to control the vehicle in such mode, the steering apparatus 104 being in the first position P1 provides more space for the driver 102 and/or prevents the driver 102 from unintentionally intervening in the autonomous driving mode.

The second position P2 may correspond to a non-retracted position, in which the steering apparatus 104 protrudes from the instrument panel 106 towards the driver 102. The second position P2 is suitable for driving the vehicle in a normal mode, in which the driver 102 is controlling/driving the vehicle himself. Since the driver 102 usually needs the steering apparatus to steer the vehicle in such mode, the second position P2 may vary dependent on the size of the driver 102 and/or a distance to the steering apparatus 104 preferred by the driver 102 etc.

Therefore, as it can be seen in FIG. 1, a distance between the driver 102 and the steering apparatus 104 varies dependent on the position of the steering apparatus, wherein a first distance d1 corresponding to the distance between the driver 102 and the steering apparatus in the first position P1, is larger than a second distance d2 corresponding to the distance between the driver 102 and the steering apparatus 104 in the second position P2.

A size of the airbag 110 in a deployed state is configured to protect the driver 102 from (severe) injuries in case, the steering apparatus 104 is in the first position P1, particularly in a fully retracted position, when a crash happens. In other words, the size of the airbag 110 is designed to provide sufficient protection, e.g., by sufficiently decelerating a forward movement of the driver 102 and/or reducing forces acting on the driver 102, in case, the steering apparatus 104 is already in a fully retracted position, when the crash happens.

In case that, when the crash happens, the steering apparatus 104 is not in the first position P1, particularly, in case, the steering apparatus 104 is in the second position P2, e.g., a non-retracted position, the steering apparatus 104 needs to be moved into the first position P1 before and/or while the airbag 110 deploys, thereby changing the distance between the driver 102 and the steering apparatus 104 from the second distance d2 to the first distance d1. Thereby, the risk of an excessive, and potentially harmful, impact of the airbag on the driver, particularly due to insufficient distance between the steering apparatus and the driver, can be at least significantly reduced or even prevented.

Such movement of the steering apparatus 104 is initiated and/or performed by the retracting mechanism (not illustrated), which is controlled by the crash control unit (not illustrated). The airbag module 108 comprising the airbag 110 can be positioned in the instrument panel 106 (see FIG. 2A) or in the steering element 112 (see FIG. 2B). Positioning the airbag module 108 in the instrument panel 106 allows using a larger airbag 110 since the instrument panel 108 can provide a larger installation space than the steering element 112. Furthermore, the steering element 112 can be freely designed without the need for providing installation space for the airbag module 108.

Figure 3:
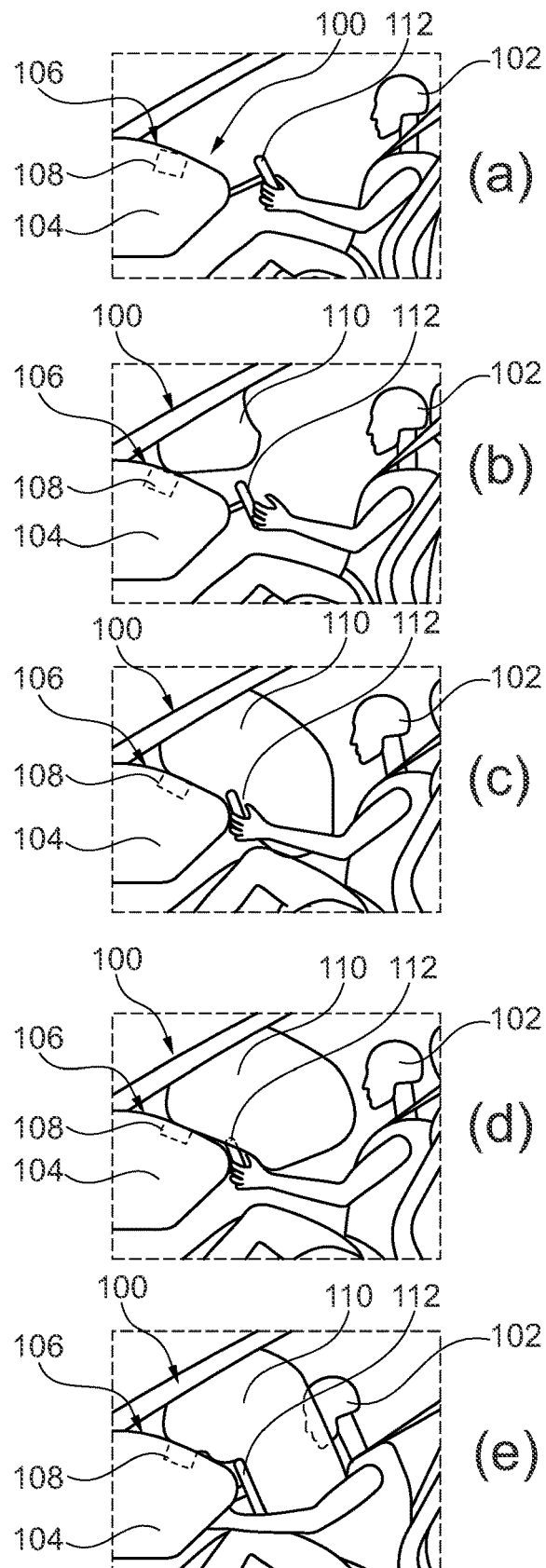
FIG. 3 shows multiple schematic views of an exemplary passenger protection unit illustrating a performance of the exemplary passenger protection unit in case of a crash.

With regard to FIG. 3, it can be seen that, upon an upcoming crash being detected, the movement of the steering apparatus 104 and the deployment of the airbag 110 are, at least partly, performed simultaneously. This allows reducing the time needed from activating the passenger protection unit to positioning the deployed airbag 110 between the steering apparatus 104 and the driver 102. In order to retract the steering apparatus 104, several retracting mechanisms are possible. For example, the retracting mechanism can comprise means configured to generate a force for initiating and/or performing a movement of the steering apparatus 104 in a retracting direction R upon activation of the retracting mechanism, such as pyrotechnic means, magnetic means, etc. Additionally, or alternatively, the retracting mechanism can be based on inertia forces which act on the steering apparatus during the crash and/or on reaction forces being generated by deploying the airbag 110.

Retracting mechanism comprising means generating a force upon activation allow initiating the movement of the steering apparatus 104 before deploying the airbag 110 and/or before the crash.

FIG. 4 shows a schematic view of an example of an activated passenger protection unit 100, wherein the airbag module 108 is positioned in the instrument panel 106. Installing the airbag module 108 in the instrument panel 106 allows controlling a deployment movement of the airbag 110. Controlling the deployment movement of the airbag 110 allows improving a positioning accuracy of the deployed airbag 110. Further, the deployment direction can be chosen to be at least at the beginning more upwards such that the airbag first deploys above the steering element 112 (see arrow A1) instead of deploying in a direction indicated by arrow A2, towards the steering element 112. This allows that a full retraction of the steering apparatus 104 is no longer required to achieve the best possible protection of the driver 102, allowing further improving response time of the passenger protection unit 110. Additionally, the first position P1 of the steering apparatus 104 not being a fully retracted position, may further allow reducing the risk of hand and/or finger injuries, specifically bruises, caused by pinching fingers and/or parts of the hands between the fully retracted steering apparatus 104 and the instrument panel 106.

Figure 5:
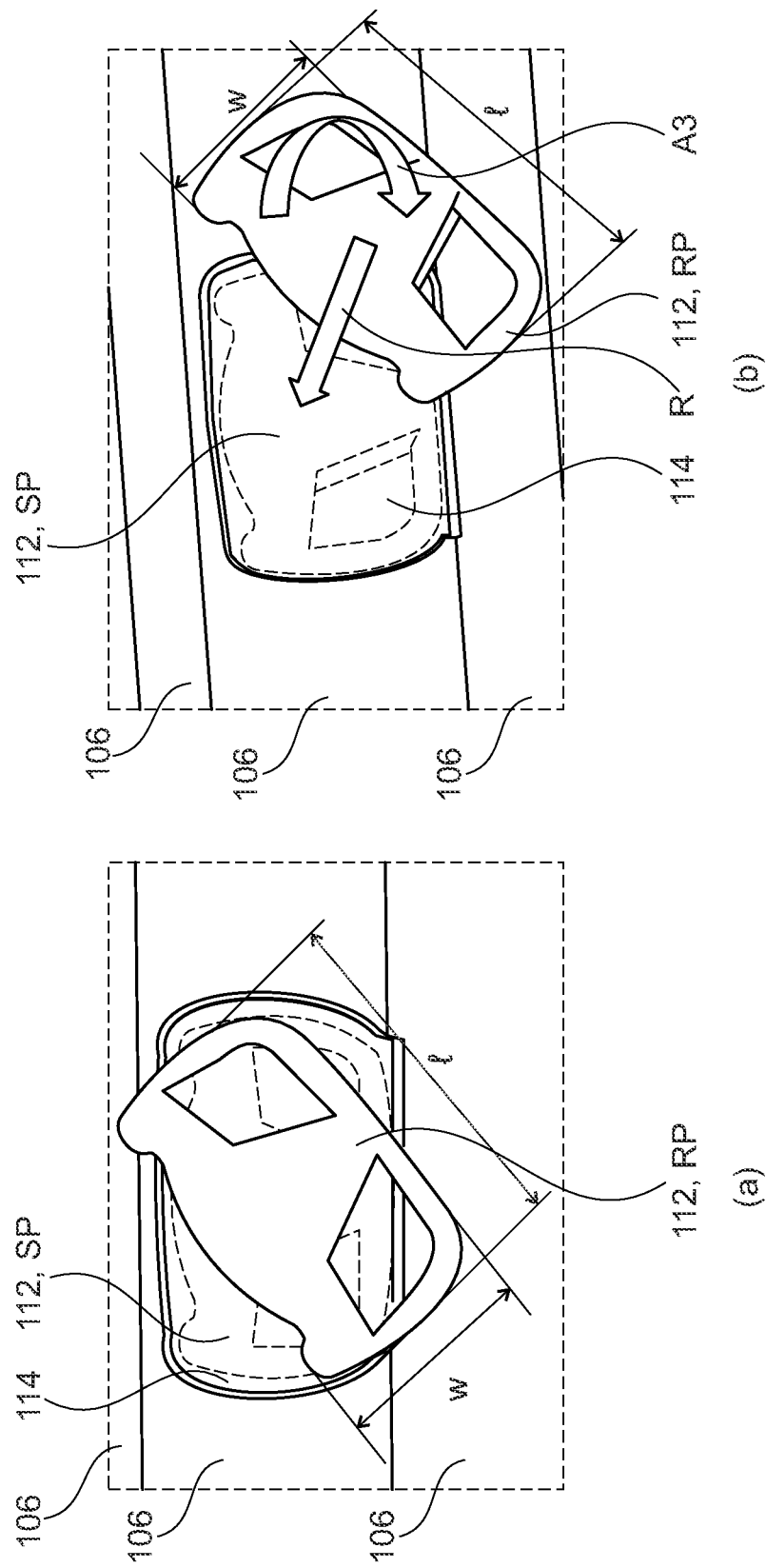
FIG. 5 shows schematic views of an exemplary position of a steering element relative to a storing compartment in an instrument panel of a vehicle.

FIG. 5 shows schematic views of an exemplary position of the steering element 112 relative to a storing compartment 114 in the instrument panel 106. The steering element 112 substantially has a rectangular shape, that is a shape in which a length dimension l is different from a width dimension w, here the length dimension l being larger than the width dimension w. For reducing an installation space for the storing compartment 114, which is configured to store the steering element in the first position P1 of the steering apparatus 104, a form and/or size of the storing compartment 114 is designed to fit the steering element 112 in at least one predetermined storing position SP.

For example, as exemplarily shown in FIGS. 5 (a) and (b), the predetermined storing position SP may correspond to a neutral position of the steering element 112, being a position of the steering element 112 usually used for driving the vehicle straight forward. In case of retracting the steering apparatus 104, it is possible that the steering element 112 is not in the predetermined storing position SP, but in a rotated or angled position RP relative to the predetermined storing position SP. Therefore, the steering element 112 needs to be (re)turned (see arrow A3 in FIG. 5(b)) into the predetermined storing position SP before and/or while the retracting movement of the steering apparatus 104 such that the steering element 112 can be stored in the storing compartment 114.

In case, the steering apparatus 104 is a steer-by-wire steering apparatus, a rotation of the steering element 112 for (re)turning the steering element 112 into the predetermined storing position SP may not be transformed or converted into a steering movement for steered wheels (not shown) of the vehicle. In other words, a rotation and/or movement of the steering element 112 for (re)turning the steering element 112 may not change a steering angle of the steered wheels.

FIG. 6 shows a schematic flow diagram of an exemplary method 200 for controlling a passenger protection unit 100. The method 200 comprises the following steps, but not necessarily in this order:
step S1: receiving, by the crash control unit, information regarding a detected crash risk and/or a detected upcoming crash,
step S2: releasing the movement of the steering apparatus 104 in at least a retracting direction R,
step S3 activating, by the crash control unit, the retracting mechanism,
step S4: retracting the steering apparatus 104 into the first position P1, and
step S5: in case of an upcoming crash, deploying the airbag 110.

This allows using only one airbag 110 of one predetermined size, the size of the airbag 110 being designed to provide sufficient protection, e.g., by sufficiently decelerating a forward movement of the driver 102 and/or reducing forces acting on the driver 102, in case, the steering apparatus 104 is already in the first position P1, when the crash happens.

In case that, when the crash happens, the steering apparatus 104 is not in the first position P1, particularly, in case, the steering apparatus 104 is in the second position P2, by releasing the movement of the steering apparatus 104 in at least the retracting direction R, and activating the retracting mechanism, the steering apparatus 104 is moved into the first position P1 before and/or while the airbag 110 deploys, thereby increasing the distance between the driver 102 and the steering apparatus 104. Thereby, the risk of an excessive, and potentially harmful, impact of the airbag 110 on the driver 102, particularly due to insufficient distance between the steering apparatus 104 and the driver 102, can be at least significantly reduced or even prevented.

Further, the movement of the steering apparatus 104 in the retracting direction R may increase or support the decelerating effect on the driver 102, thereby further reducing the risk of (severe) injuries to the driver. Consequently, the passenger protection unit 100 allows protecting the driver from (severe) injuries in case of crash regardless of the distance between the steering apparatus 104 and the driver 102 before or at the crash.

Furthermore, this method 200 does not necessarily require a determination of the position of the steering apparatus 104. In case, the steering apparatus 104 may be already in the first position P1, the steps of releasing the of the steering apparatus 104 in at least a retracting direction R, activating, by the crash control unit, the retracting mechanism, and retracting the steering apparatus 104 into the first position P1 may be performed but will not cause any further position changes of the steering apparatus 104.

While the disclosure has been illustrated and described in detail in the drawings and the description, such illustration and description are to be considered illustrative or exemplary and not restrictive. The disclosure is not limited to the disclosed examples. Other variations to the disclosed examples can be understood and effected by those skilled in the art in practicing the claimed disclosure, from the study of the drawings, the disclosure, and the appended claims.

In the claims the word "comprising" does not exclude other elements or steps and the indefinite article "a" or "an" does not exclude a plurality. A single processor or other unit may fulfill the functions of several items or steps recited in the claims. The mere fact that certain measures are recited in

LIST OF REFERENCE SIGNS 100 passenger protection unit
102 driver
104 steering apparatus
106 instrument panel
108 airbag module
110 airbag
112 steering element
114 storing compartment
200 method
d1 first distance
d2 second distance
l length dimension
w width dimension
P1 first position
P2 second position
RP rotated position
SP storing position
A1 arrow
A2 arrow
A3 arrow
R retracting direction

What is claimed is:

1. A passenger protection unit for a vehicle, comprising:
an adjustable steering apparatus configured to be lockable at least in a first position and a second position;
an instrument panel;
an airbag module comprising at least an airbag;
a crash control unit;
a retracting mechanism configured to initiate a movement of the steering apparatus in a retracting direction,
wherein the crash control unit is configured to release a retracting movement of the steering apparatus at least in the retracting direction upon detecting an upcoming crash,
wherein the crash control unit is further configured to activate the retracting mechanism, and
wherein the crash control unit is further configured to deploy the airbag upon an upcoming crash; and
a turning mechanism configured to move or turn a steering element of the steering apparatus into a predetermined storing position before and/or while the retracting movement of the steering apparatus,
wherein the predetermined storing position corresponds to a neutral position of the steering element.

2. The passenger protection unit of claim 1, wherein the retracting mechanism comprises a pyrotechnic means configured to generate a retracting force for moving the steering apparatus into the first position.

3. The passenger protection unit of claim 1, wherein the retracting mechanism comprises a magnetic means configured to apply a magnetic force for moving the steering apparatus into the first position.

4. The passenger protection unit of claim 1, wherein the retracting mechanism is configured to move the steering apparatus into the first position by using inertia forces acting during the crash.

5. The passenger protection unit of claim 1, wherein the retracting mechanism is configured to move the steering apparatus into the first position by using reaction forces generated by deploying the airbag.

6. The passenger protection unit of claim 1, wherein the turning mechanism is integrated into the retracting mechanism.

7. The passenger protection unit of claim 1, wherein the airbag module is positioned in a steering element of the steering apparatus.

8. The passenger protection unit of claim 7, wherein the steering element comprises a rectangular design.

9. The passenger protection unit of claim 1, wherein the airbag module is positioned in the instrument panel.

10. The passenger protection unit of claim 9, wherein a deployment movement of the airbag is controllable.

11. The passenger protection unit of claim 1, wherein the airbag module further comprises an activation device configured to initiate deploying the airbag.

12. The passenger protection unit of claim 1, wherein the deployed airbag is configured to be positioned between the steering apparatus in the first position and the passenger.

13. A vehicle, comprising:
a passenger compartment,
an advanced driver assistance system, and
a passenger protection unit, comprising:
an adjustable steering apparatus configured to be lockable at least in a first position and a second position;
an instrument panel;
an airbag module comprising at least an airbag;
a crash control unit;
a retracting mechanism configured to initiate a movement of the steering apparatus in a retracting direction,
wherein the crash control unit is configured to release a retracting movement of the steering apparatus at least in the retracting direction upon detecting an upcoming crash,
wherein the crash control unit is further configured to activate the retracting mechanism, and
wherein the crash control unit is further configured to deploy the airbag upon an upcoming crash; and
a turning mechanism configured to move or turn a steering element of the steering apparatus into a predetermined storing position before and/or while the retracting movement of the steering apparatus,
wherein the predetermined storing position corresponds to a neutral position of the steering element,
wherein the advanced driver assistance system is configured to transmit information to the crash control unit of the passenger protection unit regarding an upcoming crash.

14. The vehicle of claim 13, wherein the retracting mechanism comprises a pyrotechnic means configured to generate a retracting force for moving the steering apparatus into the first position.

15. The vehicle of claim 13, wherein the retracting mechanism comprises a magnetic means configured to apply a magnetic force for moving the steering apparatus into the first position.

16. The vehicle of claim 13, wherein the retracting mechanism is configured to move the steering apparatus into the first position by using inertia forces acting during the crash.

17. The vehicle of claim 13, wherein the retracting mechanism is configured to move the steering apparatus into the first position by using reaction forces generated by deploying the airbag.

18. A method, comprising:
receiving, by a system comprising a processor, information regarding a detected upcoming crash;

based on the detected upcoming crash, releasing, by the system, a retracting movement of a steering apparatus in at least a retracting direction, wherein the steering apparatus is configured to be lockable at least in a first position and a second position;

activating, by the system, a retracting mechanism;

retracting, by the system, the steering apparatus into the first position;

in case of the detected upcoming crash, deploying, by the system, an airbag;

moving or turning a steering element of the steering apparatus into a predetermined storing position before and/or while the retracting movement of the steering apparatus,
  wherein the predetermined storing position corresponds to a neutral position of the steering element.

* * * * *